United States Patent Office 2,873,175
Patented Feb. 10, 1959

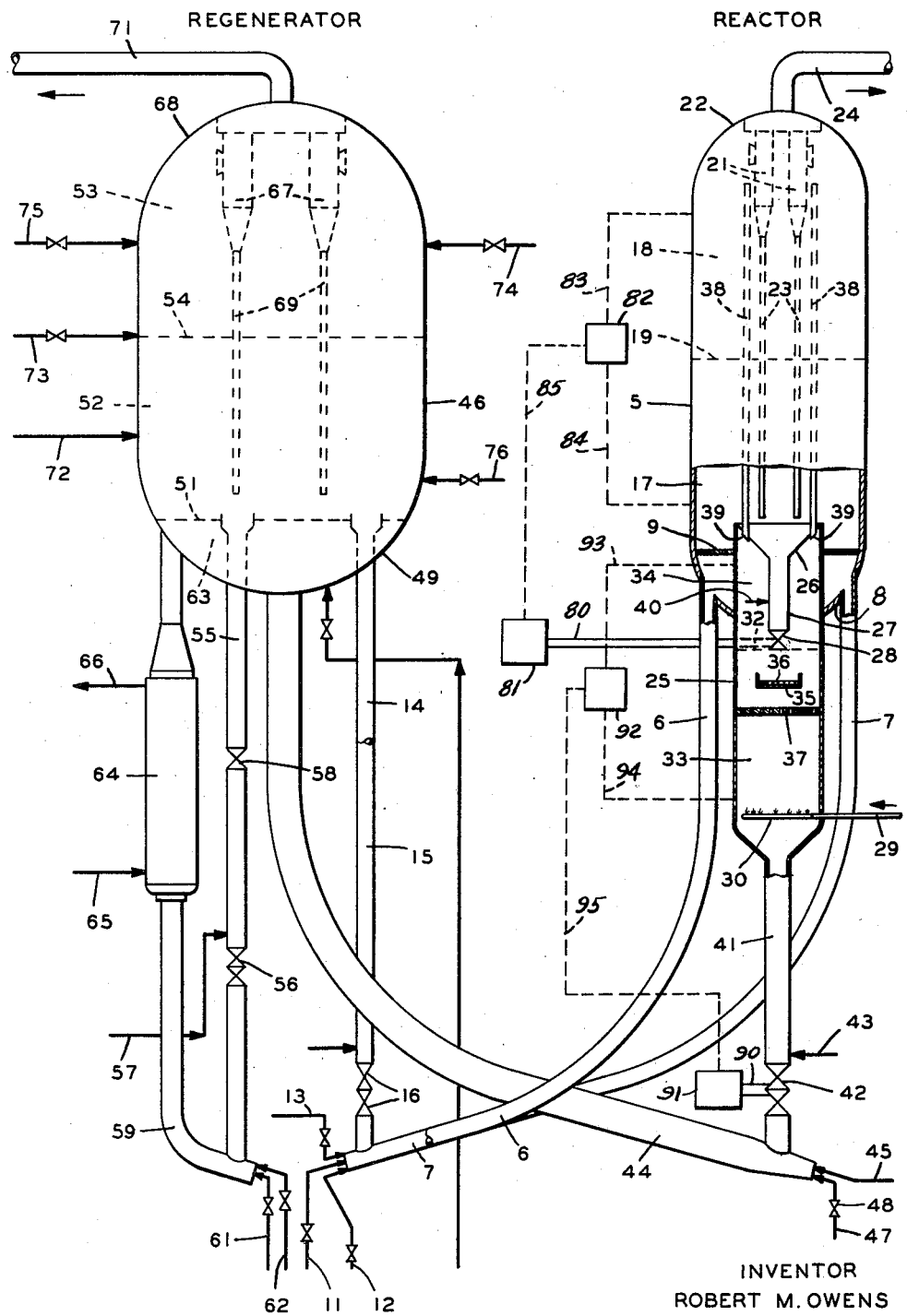
Feb. 10, 1959  R. M. OWENS  2,873,175
APPARATUS FOR CATALYTIC CONVERSION OF HYDROCARBON FLUIDS
Filed Sept. 10, 1952
INVENTOR
ROBERT M. OWENS
BY E. F. Liebrecht
William Klabunde
ATTORNEYS

2,873,175

APPARATUS FOR CATALYTIC CONVERSION OF HYDROCARBON FLUIDS

Robert M. Owens, Ozone Park, N. Y., assignor to The M. W. Kellogg Company, Jersey City, N. J., a corporation of Delaware Application September 10, 1952, Serial No. 308,747

7 Claims. (Cl. 23—288)

This invention relates to improvements in the conversion of fluid reactants in the presence of subdivided solid contact material, and more particularly to conversion processes wherein fluid reactants in gaseous or vaporous state are contacted in a confined zone with a mass or bed of solid particles maintained in a turbulent fluid-like condition by passing the gaseous or vaporous reactants upwardly through the solid particle mass.

This application is a continuation-in-part of copending application Serial No. 4,968, filed on behalf of the same inventor on January 29, 1948, now abandoned.

The present invention is especially applicable to fluid catalytic cracking processes for the treatment of hydrocarbon oils wherein hydrocarbon vapors are passed upwardly through a mass of solid catalyst particles in a confined contact zone at a velocity adapted to maintain the catalyst particles in a state of phase separation comprising a lower dense phase having a high catalyst particle concentration imparting fluid characteristics to the mass and an upper diffuse phase having a low particle concentration by reason of the disengagement therein of the catalyst particles from the gaseous hydrocarbon stream. In the conversion or reaction stage of fluid catalytic cracking the catalyst and hydrocarbon vapors are contacted at suitable reaction temperatures for a time sufficient to carry out the desired conversion, during which the catalyst particles become contaminated with adsorbed and deposited carbonaceous material.

In a preferred embodiment of the fluid catalytic cracking process the contaminated catalyst is continuously withdrawn from the dense phase of the conversion zone and is passed to a second contact zone wherein under similar conditions of phase separation the particles are contacted with a rising stream of oxygen-containing gas for the purpose of regenerating the catalyst by burning the combustible material on the solid particles, after which the regenerated catalyst may be returned in a cyclic procedure to the conversion or reaction zone for reuse.

In addition to the hydrocarbons adsorbed in and deposited upon the catalyst particles, there are substantial amounts of gaseous and vaporous hydrocarbons entrained within the catalyst stream which, if carried along with the mass of catalyst particles to the regeneration zone, are burned with the carbonaceous material or coke formed on the catalyst particles, resulting in a needless waste of valuable light hydrocarbon material and a reduction in the coke-burning capacity of the regenerator unit. Recovery of entrained hydrocarbons and vaporizable adsorbed hydrocarbons is usually effected by a stripping operation, in which the contaminated catalyst stream after withdrawal from the reaction zone is contacted with a gaseous or vaporous stream of a suitable fluid stripping medium, such as steam, combustion gases, nitrogen, carbon dioxide, etc., for the purpose of displacing the vaporous hydrocarbons.

Although it is capable of more general application, the present invention will be described particularly in connection with the stripping of vaporizable hydrocarbons from the contaminated catalyst stream withdrawn from the reaction of a fluid catalytic cracking unit, such as might be employed, for example, for the processing of about 15,500 B. P. S. D. of a Mid-Continent heavy gas oil.

A principal object of the invention is to provide a process and apparatus of simple, compact, and economical design and high efficiency operation for the catalytic conversion of hydrocarbon oils in which there is maximum recovery of lighter hydrocarbon constituents.

Another object is to provide a method and apparatus for effectively stripping a stream of contaminated catalyst particles withdrawn from the reactor of a fluid catalytic cracking unit in which there is substantially no recycling of catalyst between the reaction and stripping zones, and in which substantial amounts of vaporizable hydrocarbons are separated from the contaminated catalyst stream prior to its contact with the fluid stripping medium.

A further object is to provide an integral reactor and stripper unit of substantially symmetrical design and having segregated reaction and stripping zones, in which the movement of catalyst between the zones is along substantially vertical straight paths, the whole being so constructed that there is a minimum of structural stresses as a consequence of differential expansion between the reactor and the stripper.

These and other objects are effected by this invention, as will be apparent from the following description and claims taken in connection with the accompanying drawing forming a part of this application, in which the reactor and regenerator units of a typical fluid catalytic cracking system embodying the improvements of this invention are diagrammatically shown.

Referring to the drawing, the numeral 5 denotes a conventional reactor having a pair of feed inlet lines 6 and 7 attached to the bottom head 8, preferably at diametrically opposite points, as shown.

Through inlet lines 6 and 7 a mixture of fresh regenerated catalyst and hydrocarbon vapors in a ratio of about 10 pounds of catalyst per pound of oil, with a small amount of steam, is introduced at approximately reaction temperature to the lower portion of the reaction zone below an annular grid member 9.

The hydrocarbon feed is supplied to the lower end of each feed inlet line 6 and 7 through valved lines 11 and 12. Fresh gas oil which, preferably, has previously been preheated to about 550° F.–650° F. by conventional means, such as heat exchangers and a feed preheater furnace, is introduced to the feed inlet lines through lines 11. Settler bottoms from the recovery system, not shown, reslurried with either fresh or recycle gas oil, are introduced to the feed inlet lines through lines 12. Steam at temperatures of about 275° F.–300° F. is introduced into the lower ends of feed inlet lines 6 and 7 through valved lines 13, suitable provision being made for the introduction of large quantities of steam in the event of a cut-off in the flow of fresh feed oil. Adjacent the lower end of feed inlet lines 6 and 7 hot regenerated catalyst withdrawn from the regeneration zone through standpipes 14 and 15 is introduced to the partially preheated streams of oil and slurry. The regenerated catalyst entering the feed lines is substantially at regeneration zone temperatures of 1025° F. to 1100° F., so that the oil is flash-vaporized by contact with the hot circulating catalyst before passing into the reactor. The flow of regenerated catalyst into the oil feed inlet lines 6 and 7 is regulated by slide valves 16 at the base of the standpipes 14 and 15, so that the resultant mixture of oil vapor, catalyst and steam is substantially at the desired reaction temperature, which may be in the range of 875° F. to 975° F.

Although the mixture of oil vapors, catalyst and steam is conveyed at relatively high velocity in the range of about 25–35 ft./sec., it is partially reacted in the feed inlet lines 6 and 7 before entering the reaction zone through the distributing grid 9. In reactor 5, where the conversion is completed, the velocity is considerably reduced by reason of the substantial increase in cross-section flow area, so that the catalyst is maintained on top of the grid as a fluidized bed in a state of phase separation comprising a lower dense phase 17 of relatively high concentration in the order of about 20–40 lbs./cu. ft. and an upper diffuse phase 18 of low particle concentration, the latter constituting a disengaging zone wherein the larger portion of the catalyst drops out of the rising stream of hydrocarbon vapors. The zone of separation, or interface, separating the dense and diffuse phases is fairly well defined and is designated in the drawing by the broken line 19.

As a consequence of the conversion occurring within the reaction zone a carbonaceous deposit forms on the catalyst particles as a contaminant, decreasing their catalytic activity. Such deposition is in the form of adsorbed vaporizable hydrocarbons and coke, which may be removed by stripping and regenerating operations. Contaminated or spent catalyst is continuously withdrawn from the dense phase 17 of the reactor for such purposes, the rate of withdrawal determining the bed depth, that is, the level of the interface 19 within the reactor.

The velocity of the rising vapor stream in the reactor is preferably in the range of 1 to 1.5 ft./sec., so that the major portion of the catalyst particles become disengaged from the gaseous stream of reaction products within the diffuse phase or disengaging zone 18 before the latter is withdrawn overhead and passed to the usual recovery system, not shown. A further portion of the entrained catalyst is removed from the gaseous stream by conventional separating means, such as the centrifugal separators or cyclone 21 suspended within the reaction zone from the top head 22. The separated catalyst is returned to a low point within the dense bed 17 by diplegs 23. The product gases, plus a trace of fine catalyst, are passed overhead through line 24 to the conventional fractionating system, from which the catalyst is returned to the reactor as a slurry through line 12.

Spent catalyst is continuously withdrawn from the dense phase 17 of the reactor and is passed downwardly through a confined stripping zone extending from a point within the dense bed to a point a substantial distance below the bottom of the reactor. The stripping zone is suitably formed as an elongated hollow cylinder 25 projecting concentrically upward through the bottom head 8 and through the central opening in the annular grid 9 to a point within the dense phase, preferably near the bottom.

A funnel member 26 is joined along its rim to the upper end of cylinder 25, the neck portion 27 of the funnel projecting inward and forming a standpipe for the passage of catalyst from the reactor dense bed 17 into the hollow cylinder 25. A slide valve 28 at the lower end of the neck 27 controls the rate of catalyst withdrawal, so that the desired bed depth within the reactor may be maintained. Within the funnel 26 a zone for unhindered settling of catalyst particles withdrawn from the bed 17 is provided.

The hydrocarbon vapor stream and gaseous reaction products rise from the grid 9 in an annular stream about the upper end of cylinder 25 creating immediately above the mouth of the funnel a zone wherein the catalyst particles may disengage themselves from the gaseous stream and settle into the funnel mouth.

Passing into the settling zone the catalyst carries with it in the interstices between the solid particles entrained hydrocarbon vapors in addition to the strippable hydrocarbon material adsorbed on the catalyst particles.

Within the funnel mouth the rapid settling of the catalyst causes the particle concentration to increase, while at the same time freeing some of the entrained hydrocarbons which rise into the dense bed 17 and are conveyed upwardly with the main body of reaction gases. The density of the catalyst in reactor bed 17 may be in the range of about 20–25 lbs. per cu. ft. The settling action within the funnel 26 causes a substantial increase in the catalyst density and effects an appreciable reduction in the volume of entrained reaction vapors. The increase in density may be in the order of about 4–10 lbs., with a maximum preferred range of about 3 to 35 pounds per cubic foot. Thus, in passing from the bed 17 into the funnel 26 a measure of preliminary stripping occurs by reason of the settling, in the absence of a stripping medium which displaces the hydrocarbon vapors associated with the catalyst. To maintain proper flowing properties in the catalyst stream, however, line 40 is provided to introduce into the stripper inlet line 27 a suitable aerating medium.

Although not a necessary requirement, it is preferred that the lower ends of diplegs 23 of the cyclones 21 terminate adjacent the circumference of the mouth of funnel 26, so that the catalyst separated from the product vapors may be passed in a straight path downwardly into the funnel without substantial contact with the rising stream of reaction gases in the lower portion of the dense bed. Although the diplegs in the drawing have been illustrated as terminating a short distance above the rim of the funnel 26, they may, if desired, project into the funnel mouth.

The partially stripped dense stream of spent catalyst passed downwardly through the stripper inlet line 27 at a velocity in the order of 4–8 ft./sec. and is discharged through slide valve 28 into the enlarged stripping area provided by the hollow cylinder 25 where it immediately releases additional strippable hydrocarbons by reason of the sudden release of pressure and the rapid dispersion of the catalyst particles.

A suitable stripping medium, such as steam, is introduced near the bottom of the stripper through line 29 and distributing spider 30 and travels upwardly through the stripping zone at a velocity suitable to maintain the catalyst within the zone in a state of phase separation. Spider 30 is placed at a substantial distance above the bottom of the stripper in order to provide a settling space for the catalyst. The interface 32 between the dense phase 33 and the diffuse phase 34 is maintained at or near the lower end of stripper inlet line 27, the elevation of the slide valve 28 being such as to permit operation with a maximum dense bed depth and a minimum disengaging height. To minimize the disturbance in the dense bed caused by the downward force of the high velocity stream of spent catalyst discharging through slide valve 28, a baffle, such as pan 35, is placed centrally within the stripper to intercept the stream of spent catalyst and to divert it to all sides of the stripping zone. To minimize erosion, a honeycomb member 36 is placed in the bottom of the pan 35, thus forming a series of compartments for retaining accumulations of catalyst to act as a buffer against the moving stream of spent catalyst entering through the stripper inlet line 27.

To improve the distribution of catalyst and vapors in the dense bed 33 of the stripper and also to prevent channeling of the fluid stripping medium upwardly through the bed, a horizontal grating 37 is placed at an intermediate point below the pan 35. Grating 37 extends across the stripping zone and may be supported by any suitable means attached to the vessel walls.

The fluid stripping medium, such as steam, introduced through the spider 30 at the bottom of the stripper flows upwardly at a velocity of about 1.0–1.5 ft./sec. counter-current to the flow of spent catalyst, carrying with it into the disengaging space or diffuse phase 34 the strippable hydrocarbons that entered the stripper with the spent catalyst. The stripped hydrocarbons together with the stripping steam and some fine catalyst particles not removed from the vapor stream within the disengaging space are carried upwardly through the disengaging space 34 and are vented from the stripper through a series of straight tubes or risers 38 extending upwardly through the reaction zone to join the outgoing stream of gaseous reaction products at the top of the reactor. Preferably the vented stripper effluent is withdrawn from the highest point available within the stripping zone. Accordingly, the vent risers 38 communicate at their lower ends with the stripping zone through openings 39 formed in the sloping sides of the funnel 26 adjacent the upper rim.

In a preferred arrangement, the risers 38 discharge into the reactor disengaging space 18, preferably at a high point therein adjacent the suction side of the cyclones 21, as shown in the drawing. Since the stripped vapors are conveyed through vents 38 at high velocities in the order of about 45–55 ft./sec. their point of discharge into the space 18 should be substantially above the bed level 19 in order to avoid catalyst pick-up from the surface of the dense bed.

Alternatively, however, the upper ends of risers 38 may pass completely through the dense and diffuse phases 17 and 18, respectively, and join the product stream of reaction gases at the downstream side of the cyclones 21. The vents may discharge, for example, into a common chamber with the vapor discharge ends of the cyclones. With the latter arrangement, all the catalyst entrained by the stripped vapors leaving the stripping zone would be carried over into the product recovery system through line 24.

With the present arrangement, stripping occurs in two stages. In the first, which takes place in the mouth of the funnel 26 by a settling operation without the introduction of a fluid stripping medium to displace the hydrocarbon vapors, the stripped hydrocarbons are retained in the dense bed 17 of the reaction zone where they mingle with other vaporous reaction products and are carried upwardly through the dense bed into the disengaging space 18. In the second, which takes place within the stripper 25, the stripped hydrocarbons in admixture with the fluid stripping medium are carried from the disengaging space 34 of the stripping zone directly to the upper reaches of the reactor disengaging space 18. The final settling step carried out in the base of the stripper below the stripping spider reduces to a minimum the volume of stripping products carried from the stripping zone with the stripped catalyst. Direct recycle of spent catalyst between the dense beds 17 and 33 of the reaction and stripping zones, respectively, is prevented by the slide valve 28. The velocity of the spent catalyst stream through the slide valve is sufficiently high to provide an effective seal against the admission of stripped or stripping vapors into the reactor dense bed through the funnel.

Stripped spent catalyst is continuously withdrawn from the dense bed of the stripper 25 through spent catalyst standpipe 41 at a rate controlled by a slide valve 42 at its lower end. Preferably, the rate of spent catalyst withdrawal from the stripping zone through slide valve 42 and, incidentally, by entrainment with the stripped vapors, is maintained equal to the rate of entry therein through slide valve 28. Near the lower end of standpipe 41 above the slide valve 42 a fluid, such as steam, is introduced through line 43 for aeration of the spent catalyst stream.

In its passage from the dense bed 17 of the reactor through the stripper 25 to the spent catalyst carrier line 44 the spent catalyst stream passes through several zones maintained at materially different pressures, and undergoes several changes in density. For example, the pressure measured downwardly through the dense bed 17 may increase in the order of about 2.5–4.5 lbs.; in the funnel 26 there is a further increase in static pressure, so that at the lower end of neck 27, which acts as a standpipe, there may be an additional increase of pressure in the order of about 2–3 lbs.; passing through slide valve 28 a sudden pressure drop of about 5 lbs. may be obtained, so that the strippable hydrocarbons remaining in the spent catalyst stream after the preliminary stripping obtained in the funnel mouth are substantially instantaneously subjected to a decrease of pressure; then, passing downwardly through the dense bed 33 of the stripper and through standpipe 41 the static pressure is gradually increased to a degree sufficient to pass the catalyst to the regeneration zone.

With respect to changes in density, the catalyst, starting with the reaction zone, may have a density of about 20–25 lbs./cu. ft. leaving the dense bed 17 of the reactor and passing into the stripper inlet funnel 26 the catalyst undergoes an increase in density which may be in the order of about 4–10 lbs./cu. ft. Discharging from the lower end of the funnel into the enlarged stripping zone the catalyst decreases in density to about 15–20 lbs./cu. ft. Passing downwardly through the stripper by reason of the constant draw-off through standpipe 41, the catalyst passes the spider 30 and settles in the space below the spider out of contact with the rising vapor stream. In this settling zone at the bottom of the stripper a substantial densification takes place so that the catalyst density is again raised to a level comparable to or even in excess of that within the stripper inlet line 27.

At the lower end of standpipe 41 the spent catalyst is discharged into a carrier line 44 where it is picked up by a preheated stream of oxygen-containing gas, such as air, introduced into the carrier line through line 45, and carried at relatively high velocity in the order of about 30–40 ft./sec. to the regenerator 46. The compressed air stream introduced through line 45 is preheated in the compression operation to a temperature in the range of 225°–275° F. For emergency use, an additional steam line 47 controlled by valve 48 is provided at the base of carrier line 44 so that if needed, a large volume of steam may quickly be introduced to the line. A high ratio of gas to catalyst is maintained in the carrier line 44 so that the spent catalyst is conveyed therethrough in highly diffuse phase, having a concentration in the range of about 1.5–2.0 lbs./cu. ft. Although partial combustion of the hydrocarbons deposited upon and entrained between the spent catalyst occurs within the carrier line 44, the velocity therein is such as to permit the major portion of the combustion to be carried out within the regeneration zone.

Entering the base of the regenerator 46 through the bottom head 49 the stream of spent catalyst, air and steam, with some combustion products, passes through a distributor grid 51 at the base of the regenerator into the enlarged regeneration zone above the grid. The sudden enlargement in cross-section flow area of the stream flowing from the spent catalyst carrier line 44 into the regenerator vessel reduces the velocity of the stream to an average in the range of about 1.0–1.5 ft./sec., so that, as in the reactor and stripper vessels, a phase separation of the catalyst takes place, comprising a lower dense phase 52 and an upper diffuse phase 53, separated by the interface 54.

Within the highly turbulent dense bed of the regenerator the coke deposit contaminating the catalyst, and any incidental hydrocarbons carried over by entrainment, are burned in the presence of the air. The burning is controlled by the amount of air introduced, the residence time of the catalyst particles in the combustion zone, as determined by the bed depth, and the temperature in the bed. The regenerator bed temperatures, as previously mentioned, are preferably maintained in the range of about 1025° F.–1100° F. The temperature of the regenerator is controlled by means of the conventional recycle catalyst cooling system comprising a vertical elongated standpipe 55 extending through the bottom head 49 and the grid 51 of the regenerator and having its upper end in open communication with the dense bed 52 at a point immediately above the grid. A slide valve 56 near the lower end of standpipe 55 controls the rate of catalyst withdrawal from the regenerator dense bed 52. Immediately above the slide valve 56 a stream of aerating medium, such as air, is introduced into the standpipe through line 57. To avoid serious erosion difficulties the pressure drop which would normally be taken through the slide valve 56 may be taken in part through an additional slide valve 58 inserted at an intermediate point in the standpipe.

At the base of the standpipe 55 the stream of recycle catalyst is discharged into a recycle catalyst carrier line 59 through which it is conveyed by a mixed stream of air, introduced through line 61, and steam, introduced through line 62, upwardly to the space 63 at the bottom of the regenerator below the grid 51. A recycle catalyst cooler 64 inserted in the carrier line 59 removes a portion of the heat from the recycle catalyst stream, so that the cooled catalyst in returning to the dense bed of the regenerator provides the desired temperature control with the regenerator. The hot catalyst passing through the cooler 64 may be in indirect heat exchange with a stream of water introduced through line 65, which is discharged as steam through line 66.

The gaseous products of combustion within the regenerator dense bed pass upwardly through the disengaging space 53 where the major portion of the catalyst settles out of the gaseous stream. The gaseous products with entrained catalyst particles are discharged overhead from the regeneration zone through a series of centrifugal separators or cyclones 67 supported from the top head 68 of the regenerator. Separated catalyst particles are returned to a low point within the dense bed 52 by diplegs 69. The gaseous effluent from the cyclones is passed to a flue, not shown, through discharge outlet 71.

In passing from regenerator outlet line 71 to the flue, the combustion gases may be treated in the usual manner for waste heat recovery and the recovery of fine catalyst particles which were not removed by the cyclones 67. Catalyst fines so recovered are returned to the dense bed 52 of the regenerator at an intermediate level through line 72. Additional make-up catalyst may be added to the system at a point in the regenerator near the interface 54 through line 73.

As a supplemental control for the temperature in the regenerator bed a water spray is provided in the disengaging space 53. Water is introduced through line 74 and serves to cool the outgoing flue gas as well as the top of the catalyst bed. As a safeguard against excessive temperature increases in the space 53 resulting from secondary combustion of gases above the catalyst bed, emergency sprays may be provided to cause a sudden drastic reduction in the exit gas temperature. Water for this purpose is introduced through line 75.

Although valves 28 and 42 may be any type of valve which meets the engineering requirements of the system, the prefered embodiment illustrated in the drawing employs slide valves automatically operated to maintain a predetermined or desired bed level of fluidized catalyst in reactor 22 and stripper 25 respectively. The particular components employed for the automatic valve operation are commercially available but have not been used heretofore in the combinations shown.

Valve 28 is a rather massive affair because it must support great weight and resist specific erosion. Preferably, it is a large horizontal steel plate about 2 inches thick, having an opening in the center, and sliding horizontally in slide tracks to control the flow of the dense column of catalyst descending through standpipe 27 into stripping vessel 25. This massive version of the conventional slide valve is operated by a reciprocable control bar 80, which passes through the wall of the stripping vessel 25 by way of a stuffing box opening at a point below the intersection of a reactor vessel bottom head 8 with stripping vessel 25. Control rod 80 is actuated in or out to open or close slide valve 28 by hydraulic means 81, preferably a piston operated by oil under pressure. The valve supplying oil to hydraulic actuator 81 is in turn controlled by a bed level detector 82. The usual mode of operation for such a bed level detector is that steam under pressure is supplied to opposite sides of a diaphragm in detector 82 and leaked through capillary lines 83 and 84 into the upper and lower regions of reactor 22. The continuously flowing steam encounters and detects a difference in pressure at the two elevations, which indicates the depth of fluidized reactor bed 17. The difference in pressure so detected operates a compressed air line 85, which in turn operates the oil valves which control slide valve actuator 81. The bed level that may be desired for a particular case will depend upon a great many variable factors, such as the fineness of the catalyst, its cost, the character of the reactant gases, the products desired, etc. However, for whatever level may be desired in a particular case, detector 82 and actuator 81 may be set so that steam leaks continuously into reactor 22 twenty-four hours a day, and continuously operates actuator 81 so that valve 28 is constantly moving slightly, to increase or restrict flow. Bed level 19 is thus maintained within a tolerable range despite unavoidable irregularities in process operation.

It is necessary to restrict the rise and fall of bed level 32 of the dense phase 33 in stripping vessel 25. It is a preferred species of the present invention to automatically operate valve 42 so as to maintain a level sufficiently high to provide good stripping but not so high as to so fill stripping vessel 25 that there is inadequate settling space above dense phase 33 within the stripping vessel. The system employed may be similar to that used for controlling valve 28. Valve 42 may be a horizontal plate slide valve operated by a control rod 90 passing through a stuffing box opening. Hydraulic actuator 91 may be used to keep valve 42 in constant slow reciprocation as required to maintain bed level 32 at the elevation desired (which may very well be substantially lower than the point indicated in the drawing). Detector 92 will detect the bed level by means of steam capillary lines 93 and 94 and will control actuator 91 by means of compressed air line 95.

The method and apparatus of the present invention are practical in very large catalyst systems, in which great strength, economy of construction, and ease of operation are more important and more difficult to achieve than in chemical apparatus of average size. For example, in a typical catalytic cracking process, fluidized catalyst bed 17 would have the depth of about 31 feet and a diameter of 24 feet 6 inches, and weigh over 150 tons. In such a bed, stripping vessel 25 might suitably be a cylinder about 12 feet in diameter, projecting above grid 9 about 3 feet, and extended below bottom head 8 a distance of about 25 feet. Standpipes 27 and 41 would have a diameter of about 3 feet in such a structure and standpipe 27 a length of about 15 feet from the top of funnel 26 to valve 28. Baffle 35 is exposed to severe erosion since it is directly in the path of a massive 3 foot jet of catalyst descending from standpipe 27. However, this catalyst tends to pile up in a mound on baffle 35 and to be laterally diverted and thus distributed throughout the horizontal cross-section of stripping vessel 25. The downward momentum of the catalyst is reduced. The bed level may be selected at an elevation above or below baffle 35, or even a little above slide valve 28, provided the dense phase 33 is deep enough to effect said stripping and yet not so high as to reduce settling space 34. Given the dimensions already mentioned as an example, baffle 35 may suitably be about 6 feet in diameter and located 1 or 2 feet below the outlet of valve 28. None of the dimensions are critical except in relationship to one another. A critical relationship in stripping vessels has been found to be the $L/D$ ratio. Of course, an optimum $L/D$ ratio will depend upon the nature of the process and the apparatus; in the apparatus of the present invention, stripping is inadequate if the $L/D$ ratio falls much below 1, and it may be stated as a range for a preferred species that the depth of stripping zone bed 33 should be maintained at no less than the diameter of stripping vessel 25. Diameter as used here and in the claims is intended to mean the average horizontal dimension, even if the vessel is not a cylinder. Another critical dimension is the length of standpipe 27. The annular space around standpipe 27 must serve as a settling zone and it is undesirable to discharge the descending spent catalyst within this settling zone. It is therefore a preferred species to extend standpipe 27 downwardly a distance at least as great as the minimum settling zone height at which it is desired to operate. Minimum settling zone height, also called minimum disengaging space, is a function to some extent of the velocity, the amount of catalyst carry-over to be tolerated, etc. However, in settlers of the type herein disclosed, experience demonstrated that the best minimum settling zone height for design purposes is about 15 feet, and this figure holds almost independent of the variables. However, in smaller vessels some flexibility is allowable and it may be stated as a rule that the minimum settling zone height should be not less than 10 feet above the dense phase, the surface of the dense phase being defined as the region in which density diminishes most rapidly with increasing height. Given the preferred vertical settling distance, the standpipe should extend downwardly into the stripping zone at least this far; also, it may be said that the dilute phase ought not to be less than the minimum settling zone height, a preferred species of the invention being that this height be specified as not less than 10 feet. If the standpipe is not long enough, the method of the invention will work, but in a less desirable manner since a larger amount of spent catalyst finds its way into the upwardly rising stripping vapors. Another factor governing the length of standpipe 27 is that valve 28 ought to be located at a point below the intersection of bottom head 8 and stripping vessel 25 so that control rod 80 does not have to be brought out through the wall of bottom head 8.

The dimensions of baffle 35 can also be troublesome. If the baffle is too large, upward velocities through the annular space around the baffle become excessive; whereas, if it is too small, there is a downward jet of catalyst around its periphery. A preferred range for the area of baffle 35 has been found to be not less than the cross-sectional area of standpipe 27 but not more than one half the horizontal cross-section of stripping vessel 25.

To illustrate the application of the above-described embodiment of the invention to a typical large scale commercial unit, reference may be made to the following tabulated data, designated Table I, representing preferred operating conditions for a fluid catalytic cracking unit designed to process about 15,500 barrels per stream day of Mid-Continent gas oil.

EXAMPLE

Conversion

| | |
|---|---|
| Feed: | |
|   20° Mid-Continent heavy gas oil, bbls./day | 15,500 |
|   Steam, lbs./hr | 15,250 |
|   Weight ratio of catalyst to oil | 10 |
|   Temperature of preheated gas oil, °F | 600 |
| Reactor inlet lines (6 and 7): | |
|   Density, lbs./cu. ft | 3.88 |
|   Velocity, ft./sec | 29 |
|   Pressure at reactor inlets, lbs | 14.1 |
| Reactor (5): | |
|   Density below grid (9), lbs./cu. ft | 20 |
|   Pressure below grid (9), lbs | 13.4 |
|   Density of dense phase (17), lbs./cu. ft | 22.4 |
|   Pressure at bottom of dense phase (17), lbs | 12.4 |
|   Vapor velocity in dense phase (17), ft./sec | 0.90 |
|   Vapor velocity leaving dense phase (17), ft./sec | 1.11 |
|   Pressure in diffuse phase (18), lbs | 9.3 |
|   Vapor velocity entering cyclones (21), ft./sec | 1.42 |
|   Outlet pressure (24), lbs | 8.8 |
|   Outlet velocity (24), ft./sec | 101 |
|   Temperature, °F | 900 |
| Stripper inlet (26): | |
|   Density, lbs./cu. ft | 28 |
|   Velocity in line (27), ft./sec | 5.93 |
|   Pressure at base of line (27), lbs | 9.3 |
|   Pressure drop through slide valve (28), lbs | 5.1 |
| Stripper (25): | |
|   Pressure in diffuse phase (34), lbs | 9.3 |
|   Density of dense phase (33), lbs./cu. ft | 17.7 |
|   Density leaving stripper (25), lbs./cu. ft | 28 |
|   Vapor velocity in dense phase (33), ft./sec | 11.8 |
| Reactor standpipe (41): | |
|   Density, lbs./cu. ft | 28 |
|   Velocity, ft./sec | 5.93 |
|   Pressure at base of standpipe, lbs | 13.8 |
|   Pressure drop through slide valve (42), lbs | 3.0 |

Regeneration

| | |
|---|---|
| Spent catalyst carrier line (44): | |
|   Density, lbs./cu. ft | 1.82 |
|   Velocity, ft./sec | 35.2 |
|   Pressure at regenerator inlet, lbs | 11.8 |
| Regenerator (46): | |
|   Density below grid (51), lbs./cu. ft | 20 |
|   Pressure below grid (51), lbs | 10.5 |
|   Density of dense phase (52), lbs./cu. ft | 16.1 |
|   Pressure at bottom of dense phase (52), lbs | 9.5 |
|   Vapor velocity in dense phase (52), ft./sec | 1.33 |
|   Pressure in diffuse phase (53), lbs | 7.3 |
|   Vapor velocity in diffuse phase (53), ft./sec | 1.39 |
|   Outlet pressure (71), lbs | 6.8 |
|   Outlet velocity (71), ft./sec | 103 |
|   Temperature, °F | 1050 |
| Regenerator standpipes (14 and 15): | |
|   Density, lbs./cu. ft | 28 |
|   Velocity, ft./sec | 5.5 |
|   Pressure at base of standpipes, lbs | 17.9 |
|   Pressure drop through slide valves (16) | 3.0 |
| Recycle catalyst cooler (64): | |
|   Density in standpipe (55), lbs./cu. ft | 28 |
|   Velocity in standpipe, ft./sec | 3.58 |
|   Pressure at base of standpipe, lbs | 14.0 |
|   Total pressure drop through slide valves (56 and 58), lbs | 4.3 |
|   Density in carrier line (59), lbs./cu. ft | 0.76 |
|   Velocity in carrier line, ft./sec | 25.8 |
|   Pressure at regenerator inlet, lbs | 11.3 |

It is to be understood that the foregoing embodiment is given only by way of example, and that the invention is not to be restricted thereto. Numerous other operating conditions and various modifications within the spirit of the invention will be apparent from the above description to those skilled in the art. It is desired, therefore, that only such limitations shall be placed thereon as are set forth in the appended claims.

What is claimed is:

1. In a fluid catalytic conversion apparatus which includes a reactor vessel, cyclone separators for withdrawing effluent suspended in the upper region of the interior of said vessel, a substantially horizontal grid floor in the lower part of said vessel, a bottom head forming the bottom of said vessel below said grid floor, and conduit means for introducing fluid into said bottom head under said grid floor, an improved means for withdrawing spent catalyst and stripping said catalyst of reactant gases which includes: a vertically elongated stripping vessel supported in said bottom head substantially coaxially with said reactor vessel, upwardly projecting into the interior of said reactor vessel above said grid floor, and downwardly projecting externally to said reaction vessel below the intersection of said bottom head with said stripping vessel; a substantially vertical standpipe of restricted cross-section concentrically positioned in the upper part of said stripping vessel, and providing communication between the lower part of said reactor vessel and the interior of said stripping vessel at an elevation below said intersection between said bottom head and said stripping vessel; a plurality of vertical conduits providing communication between the upper part of the interior of said stripping vessel and the upper interior of said reactor vessel at the elevation of said cyclone separating means; a substantially horizontal baffle means positioned concentrically within said stripping vessel below the outlet of said standpipe, and presenting a horizontal cross-sectional area not less than that of said standpipe but not larger than one half the internal horizontal cross-sectional area of said stripping vessel; a slide valve in the lower end of said standpipe to control the flow therefrom onto said substantially horizontal baffle; control rod means for operating said slide valve extending through the wall of said stripping vessel below the intersection of said bottom head and said stripping vessel; means for introducing stripping gases into said stripping vessel at an elevation below said valve a greater distance than the diameter of said stripping vessel; a second substantially vertical standpipe downwardly extending from the bottom of said stripping vessel; and a second valve means in said second standpipe for controlling the rate of withdrawal of stripped catalyst from said stripping zone.

2. In a fluid catalytic conversion apparatus which includes a reactor vessel, cyclone separators for withdrawig effluent suspended in the upper region of the interior of said vessel, a substantially horizontal grid floor in the lower part of said vessel, a bottom head forming the bottom of said vessel below said grid floor, and conduit means for introducing fluid into said bottom head under said grid floor, an improved means for withdrawing spent catalyst and stripping said catalyst of reactant gases which includes: a vertically elongated stripping vessel supported in said bottom head substantially coaxially with said reactor vessel, upwardly projecting into the interior of said reactor vessel above said grid floor, and downwardly projecting externally to said reaction vessel below the intersection of said bottom head with said stripping vessel; a substantially vertical standpipe of restricted cross-section concentrically positioned in the upper part of said stripping vessel, and providing communication between the lower part of said reactor vessel and the interior of said stripping vessel at an elevation below said intersection between said bottom head and said stripping vessel; a plurality of vertical conduits providing communication between the upper part of the interior of said stripping vessel and the upper interior of said reactor vessel at the elevation of said cyclone separating means; a substantially horizontal baffle means positioned concentrically within said stripping vessel below the outlet of said standpipe, and presenting a horizontal cross-sectional area not less than that of said standpipe but not larger than one half the internal horizontal cross-sectional area of said stripping vessel; a slide valve in the lower end of said standpipe to control the flow therefrom onto said substantially horizontal baffle; control rod means for operating said slide valve extending through the wall of said stripping vessel below the intersection of said bottom head and said stripping vessel; means for automatically controlling said slide valve by means of said control rod in response to the depth of dense phase contained within said reactor vessel above said grid floor; means for introducing stripping gases into said stripping vessel at an elevation below said valve a greater distance than the diameter of said stripping vessel; a second substantially vertical standpipe downwardly extending from the bottom of said stripping vessel; a second valve means in said second standpipe; and means for automatically controlling said second valve means in response to the depth of dense phase in said stripping vessel.

3. In a fluid catalytic conversion apparatus which includes a reactor vessel, catalyst separating means suspended in the upper part of said vessel for withdrawing reaction effluent therefrom, and means for introducing fluids into the lower interior of said vessel, an improved stripper for withdrawing spent catalyst and stripping said catalyst, which includes: a vertically elongated stripping vessel having an $L/D$ ratio above about 1 supported in the base of said reactor vessel and having an upper end projecting upwardly into said reactor vessel, said stripping vessel projecting at the lower end below the bottom of said reactor vessel; a collecting funnel mounted in the upper end of said stripping vessel and opening upwardly into said reaction vessel; a substantially vertical standpipe extending downwardly not less than 10 feet from said collecting funnel within the stripping vessel to an elevation below the intersection between said reaction vessel bottom and said stripping vessel; valve means in the lower end of said standpipe; control means for said valve means extending through the wall of said stripping vessel at a point below said intersection between the bottom of said reaction vessel and said stripping vessel; substantially vertical conduit means adapted to discharge gases from the upper end of said stripping vessel to the upper interior of said reaction vessel; means for introducing stripping gases into the lower part of said stripping vessel; and outlet means for downwardly withdrawing stripped catalyst from the lower part of said stripping vessel.

4. A stripping vessel for use in a fluid catalytic conversion apparatus, including a reactor vessel and a substantially horizontal grid floor disposed in the lower part of said reactor vessel, which comprises: a vertically elongated vessel supported in the base of said reactor vessel upwardly projecting into the interior of said reactor vessel above said grid floor and in open communication with the interior of said reactor vessel, means for introducing stripping gas into said elongated vessel, collecting means in the shape of an imperforate inverted truncated cone mounted in the upper end of said elongated vessel, a standpipe connected to the lower end of said collecting means and extending downwardly from said collecting means, and means mounted on said standpipe for regulating the rate of flow of solid materials through said standpipe.

5. A stripping vessel for use in a fluid catalytic conversion apparatus, including a reactor vessel and a substantially horizontal grid floor disposed in the lower part of said reactor vessel, which comprises: a vertically elongated vessel supported in the base of said reactor vessel upwardly projecting into the interior of said reactor vessel above said grid floor and in open communication with the interior of said reactor vessel, means for introducing stripping gas into said elongated vessel, collecting means in the shape of an imperforate inverted truncated cone mounted in the upper end of said elongated vessel, a standpipe connected to the lower end of said collecting means and extending downwardly from said collecting means, means mounted on said standpipe for regulating the rate of flow of solid materials through said standpipe, and at least one vertical riser connecting the upper part of said reactor vessel with said vertically elongated vessel at a point below the collecting means.

6. A stripping vessel for use in a fluid catalytic conversion apparatus, including a reactor vessel and a substantially horizontal grid floor disposed in the lower part of said reactor vessel, which comprises: a vertically elongated vessel supported in the base of said reactor vessel upwardly projecting into the interior of said reactor vessel above said grid floor and in open communication with the interior of said reactor vessel, stripping means for introducing stripping gas into said elongated vessel at a lower portion thereof, collecting means including an imperforate inverted truncated cone mounted in the upper end of said elongated vessel for receiving catalyst flowing from said reactor vessel into said elongated vessel and for discharging catalyst thus received into said elongated vessel at a point substantially below the top thereof and above said stripping means whereby there is provided within the elongated vessel and around said collecting means and discharging means a catalyst disengaging space, and means mounted on said collecting means for regulating the rate of flow of solid material from said collecting means to maintain a catalyst bed within the reactor vessel above the means for introducing stripping gas and below said catalyst disengaging space.

7. A stripping vessel for use in a fluid catalytic conversion apparatus, including a reactor vessel and a substantially horizontal grid floor disposed in the lower part of said reactor vessel, which comprises: a vertically elongated vessel supported in the base of said reactor vessel upwardly projecting into the interior of said reactor vessel above said grid floor and in open communication with the interior of said reactor vessel, stripping means for introducing stripping gas into said elongated vessel at a lower portion thereof, imperforate collecting means located in the upper end of said elongated vessel for receiving catalyst flowing from said reactor vessel into said elongated vessel and for discharging catalyst thus received into said elongated vessel at a point substantially below the top thereof and above said stripping means whereby there is provided within the elongated vessel and above said point of discharge a catalyst disengaging space, and means mounted on said collecting means for regulating the rate of flow of solid materials from said collecting means to maintain a catalyst bed within the reactor vessel above the means for introducing stripping gas and below said catalyst disengaging space.

References Cited in the file of this patent

UNITED STATES PATENTS

| | | |
|---|---|---|
| 2,304,128 | Thomas | Dec. 8, 1942 |
| 2,425,807 | Jahnig | Aug. 19, 1947 |
| 2,440,620 | Taff | Apr. 27, 1948 |
| 2,449,027 | Voorhies | Sept. 7, 1948 |
| 2,471,034 | Hall et al. | May 24, 1949 |
| 2,471,064 | Hall et al. | May 24, 1949 |
| 2,496,356 | Peet | Feb. 7, 1950 |
| 2,502,954 | Blanding | Apr. 4, 1950 |
| 2,519,150 | Ostergaard | Aug. 15, 1950 |
| 2,587,554 | Weikart | Feb. 2, 1952 |
| 2,606,863 | Rehbin | Aug. 12, 1952 |